United States Patent

Lutz et al.

[11] Patent Number: 5,973,044
[45] Date of Patent: Oct. 26, 1999

[54] ADHESION PROMOTING ORGANOSILICON COMPOSITIONS

[75] Inventors: Michael Andrew Lutz; Michael James Owen, both of Midland; Susan Victoria Perz, Essexville, all of Mich.

[73] Assignee: Dow Corning Corporation, Midland, Mich.

[21] Appl. No.: 09/143,301

[22] Filed: Aug. 28, 1998

[51] Int. Cl.$^6$ .................................................. C08K 5/54
[52] U.S. Cl. ........................... 524/267; 524/262; 524/265; 528/10; 528/29; 528/30; 528/32; 528/38; 528/41
[58] Field of Search ................................ 528/10, 29, 30, 528/32, 38, 41; 524/262, 265, 267

[56] References Cited

U.S. PATENT DOCUMENTS

| | | | |
|---|---|---|---|
| 2,349,388 | 5/1944 | Clapsadle | 252/75 |
| 2,630,446 | 3/1953 | Gresham | 260/448.8 |
| 2,776,307 | 1/1957 | Abbott | 260/448.8 |
| 3,029,269 | 4/1962 | Abbott | 260/448.8 |
| 3,629,310 | 12/1971 | Bailey et al. | 260/448.8 |
| 3,772,026 | 11/1973 | Greenwald | 96/77 |
| 3,873,334 | 3/1975 | Lee | 106/287 |
| 3,992,429 | 11/1976 | Knollmueller | 260/448.8 |
| 4,082,726 | 4/1978 | Mine | 260/46.5 |
| 4,087,585 | 5/1978 | Schulz | 428/429 |
| 4,659,851 | 4/1987 | Plueddemann | 556/431 |
| 4,719,262 | 1/1988 | Plueddemann | 525/105 |
| 4,721,764 | 1/1988 | Fujiki | 528/15 |
| 4,732,932 | 3/1988 | Waldern | 524/862 |
| 4,906,686 | 3/1990 | Suzuki | 524/730 |
| 5,424,384 | 6/1995 | Gentle | 528/12 |
| 5,486,565 | 1/1996 | Gentle | 524/730 |
| 5,595,826 | 1/1997 | Gray | 428/450 |
| 5,683,527 | 11/1997 | Angell | 156/78 |

FOREIGN PATENT DOCUMENTS

| | | |
|---|---|---|
| 1009204 | 4/1989 | Japan . |
| 3-188166 | 8/1991 | Japan . |
| 06116368 | 10/1992 | Japan . |
| 5271556 | 2/1993 | Japan . |
| 6-279691 | 10/1994 | Japan . |
| 97316293 | 12/1997 | Japan . |
| 450875 | 7/1936 | United Kingdom . |
| WO9621633 | 7/1996 | WIPO . |

OTHER PUBLICATIONS

J. Inorg. Nucl. Chem., 1968, vol. 30, pp. 721 to 727.

*Primary Examiner*—Melvyn I. Marquis
*Attorney, Agent, or Firm*—Alex Weitz

[57] ABSTRACT

This invention relates to organosilicon compositions useful as adhesion promoters for curable organopolysiloxanes, said organosilicon compositions being formed by reacting (A) a polyhydric alcohol, (B) an organosiloxane containing at least one organofunctional group and one hydroxyl or hydrolyzable group per molecule and (C) a silane containing at least three hydrolyzable groups per molecule.

8 Claims, No Drawings

ADHESION PROMOTING ORGANOSILICON COMPOSITIONS

BACKGROUND OF THE INVENTION

This invention relates to organosilicon compositions. More particularly, this invention relates to organosilicon compositions that impart improved adhesion to cured organopolysiloxane compositions.

BACKGROUND INFORMATION

U.S. Pat. No. 2,349,338 teaches using silicic acid esters of monohydric and polyhydric alcohols, including various glycol and glycerol silicate ester derivatives that are useful as corrosion prevention additives for heat transfer liquids. The corrosion prevention is afforded by the hydrolysis product of these compounds.

U.S. Pat. No. 2,776,307 claims silicone esters of the type $(R^1O)_3Si(XR^2)_nOSi(OR^3)_3$, where X can be oxygen, and n has a value of 2,3, or 4. The compounds are said to be useful as hydraulic fluids and lubricants.

U.S. Pat. No. 3,992,429 teaches novel alkoxysilane cluster compounds containing sterically hindered alkyl groups to improve hydrolytic stability. Intended uses include heat transfer fluids, hydraulic fluids, brake fluids, transmission fluids, and the like.

U.S. Pat. No. 2,630,446 teaches polymeric silicates prepared from tetraalkylsilicates and polyhydric alcohols. These silicates are intended for use as plasticizers, lubricants, and hydraulic fluid additives.

H. G. Emblem and K. Hargreaves ["The Preparation of Alkoxysilanes from Glycols and Glycol Monoethers", J. Inorg. Nucl. Chem., Vol. 30 (3), p. 721, 1968] report various reactions useful to prepare the title compounds, none of which contain silicon-bonded organofunctional groups.

UK Pat. No. 450,875 teaches a transesterification process for the manufacture of new esters of ortho-silicic acid. The disclosure indicates that esters derived from ortho-silicic acid and polyhydroxylated alcohols are known.

U.S. Pat. No. 3,029,269 teaches compounds of the type $(RO)_3SiOCR'_2(CH_2)_nCR'_2$—$OSi(OR)_3$, where n is 0–16 and R' is H or a lower aliphatic radical, and R is a saturated aliphatic radical containing from 1 to 16 carbons. The compounds are suggested as lubricants and hydraulic fluids and in general show low pour point, good viscosity and viscosity index properties as well as hydrolytic stability.

U.S. Pat. No. 5,424,384 teaches curable organosiloxane compositions with improved adhesion containing as the adhesion promoting additive a reaction product of a polyhydric alcohol and an alkoxy or isoalkenyloxy silane. Silanes containing organofunctional groups are not described in this patent.

U.S. Pat. No. 5,486,565 teaches new organosilicon compositions comprising a reaction product of a polyhydric alcohol, an alcohol containing organofunctional groups, and a moisture reactive silane. Curable organosiloxane compositions containing these compounds as adhesion promoting additives are also claimed.

U.S. Pat. Nos. 4,659,851, 4,719,262, and 4,906,686 teach reaction products of unsaturated alcohols with alkoxysilanes.

Adhesion promoters for organosiloxane compositions typically contain at least two functional groups. U.S. Pat. Nos. 3,772,026 and 3,873,334 teach acyloxy functional silanes which additionally have silicon hydride or alkenyl functionality respectively. Although the acyloxy functionality is very reactive, it liberates corrosive acetic acid upon reaction with hydroxyl groups present at the surface of the substrate or with water ingressing into the composition.

U.S. Pat. No. 4,082,726 teaches organosilicon compounds containing epoxy functional dialkoxysilyl groups and at least one alkenyl group or hydrogen atom bonded to silicon in the organosilicon compound. Adhesion with compositions containing these compounds is demonstrated after cure between 100–200° C.

U.S. Pat. No. 4,087,585 teaches physical blends of epoxy functional alkoxysilanes with silanol functional fluids containing alkenyl functionality. Cure with adhesion was obtained at elevated temperatures.

The use as adhesion promoters of multifunctional organosilanes containing ethylenic unsaturation, epoxy functionality, and alkoxy functionality is taught in U.S. Pat. No. 4,732,932.

U.S. Pat. No. 4,721,764 teaches adhesion-promoting organopolysiloxanes which contain two silicon bonded hydrogen atoms and at least one silicon bonded hydrolyzable group or oxirane group.

SUMMARY OF THE INVENTION

The organosilicon compositions of this invention comprise reaction products of 1) a polyhydric alcohol, 2) an organosiloxane containing at least one organofunctional group and one hydroxyl or hydrolyzable group per molecule and 3) a silane containing at least three hydrolyzable groups per molecule. The compositions are particularly useful as adhesion promoters for curable organopolysiloxane compositions.

DETAILED DESCRIPTION OF THE INVENTION

This invention relates to organosilicon compositions comprising at least one compound formed by the reaction of ingredients comprising 1) a polyhydric alcohol of the general formula $R^1(OH)_m$, 2) an organosiloxane containing at least two repeating units and exhibiting the average unit formula $R^2_nR^3_pX_qSiO_{(4-n-p-q)/2}$, and 3) at least one silane of the general formula $R^4_rSiY_{4-r}$, where $R^1$ represents a substituted or unsubstituted hydrocarbon radical exhibiting a valence of m that is free of ethylenic unsaturation; $R^2$ represents an unsubstituted monovalent hydrocarbon radical; $R^3$ represents a monovalent hydrocarbon radical containing an organofunctional substituent selected from the group consisting of $CH_2$=$CH$—, acryloxy, methacryloxy, epoxy, carboxy, amino, amido, acrylamido, methacrylamido, and mercapto; $R^4$ represents a monovalent hydrocarbon radical that is unsubstituted or contains an organofunctional substituent selected from the group consisting of $CH_2$=$CH$—, acryloxy, methacryloxy, epoxy, carboxy, amino, amido, acrylamido, methacrylamido, and mercapto; X represents a hydrolyzable group or a hydroxyl group, Y represents a hydrolyzable group; m is at least 2; the average value of n is from 0 to 3, inclusive; the average values of p and q are greater than 0 and no greater than 3, the sum of n, p and q does not exceed 3; and the value of r is 0 or 1, with the provisos that each molecule of said organosiloxane contains at least one $R^3$ substituent and at least one X substituent and the relative concentrations of said polyhydric alcohol, organosiloxane and silane do not cause gelation of said compound.

As used in the present specification, the hydrolyzable groups represented by X and Y include, but are not limited to, alkoxy, isoalkenyloxy, carboxy, ketoximo, amino, and amido.

The polyhydric alcohol, organofunctional organosiloxane and silane used to prepare the present organosiloxane compositions are discussed in detail in the following sections of this specification.

This invention also provides curable polymer compositions comprising (I) an organopolysiloxane, (II) curing agents for the organopolysiloxane and (III) as an adhesion promoter, an organosilicon composition of the present invention.

Examples of organopolysiloxane compositions suitable for use with the present adhesion promoters are described in U.S. Pat. No. 5,486,565 hereby incorporated by reference.

The Polyhydric Alcohol (Ingredient A)

One of the reactants used to prepare the present organosilicon compositions is a polyhydric alcohol referred to hereinafter as ingredient A and represented by the generic formula $R^1(OH)_m$ where $R^1$ represents a hydrocarbon radical exhibiting a valence of m and m is at least 2. Preferably m is from 2 to 4, inclusive.

The hydrocarbon radical represented by $R^1$ contains from 2 to about 20 carbon atoms and is substantially free of ethylenic unsaturation. Preferred polyhydric alcohols contain from 2 to 10 carbon atoms, and include but are not limited to ethylene glycol, propylene glycol, 1,3-propanediol, glycerol, 1,4-butanediol, neopentyl glycol, 2,2,2-trimethylolpropane, 2,2,2,2-tetramethylolpropane and 1,10-decanediol.

When the number of hydroxyl groups in the polyhydric alcohol exceeds the number represented by m, at least a portion of the additional hydroxyl groups are reacted to form ethers or esters prior to the reaction of the alcohol with the organosilicon compounds to form an organosilicon composition of the present invention.

The Organosiloxane (Ingredient B)

The repeating units of the organosiloxane that is reacted with the polyhydric alcohol and at least one silane described in the following section to prepare the present organosilicon compositions exhibit the average formula $R^2{}_nR^3{}_pX_qSiO_{(4-n-p-q)/2}$. In this formula $R^2$ represents an unsubstituted monovalent hydrocarbon radical; $R^3$ represents a monovalent hydrocarbon radical containing an organofunctional substituent selected from the group consisting of $CH_2=CH-$, acryloxy, methacryloxy, epoxy, carboxy, amino, amido, acrylamido, methacrylamido, and mercapto; X represents a hydroxyl group or a group that is hydrolyzed to a hydroxyl group in the presence of water; the average value of n is from 0 to 3, inclusive; the average values of p and q are greater than 0 and no greater than 3, and the sum of n, p and q does not exceed 3, with the proviso that each molecule of the organosiloxane contains at least one $R^3$ substituent and at least one X substituent.

The unsubstituted monovalent hydrocarbon radical represented by $R^2$ can contain from 1 to 20 carbon atoms. This hydrocarbon radical is substantially free of ethylenic unsaturation and is selected from alkyl radicals such as methyl, ethyl and propyl, cycloalkyl radicals such as cyclohexyl and aromatic hydrocarbon radicals such as phenyl, tolyl and benzyl.

$R^2$ is preferably alkyl containing from 1 to 5 carbon atoms, and is most preferably methyl or ethyl.

The hydrocarbon radical represented by $R^3$ contains at least one organofunctional group. The hydrocarbon portion of $R^3$ can be alkylene such as propylene or butylene, cycloalkylene such as cyclohexylene or arylene such as phenylene, tolylene or benzylene. It should be understood that when $R^3$ is vinyl, the entire $R^3$ substituent is represented by the formula $CH_2=CH-$.

As used in the present specification, the term "organofunctional group" implies that the group is capable of reacting with another group of the same type, with other groups present in the organosilicon composition, with a curable organopolysiloxane composition and/or with a metallic or non-metallic substrate. Organofunctional substituents present in the ingredient B are selected from $CH_2=CH-$, acryloxy, methacryloxy, epoxy, carboxy, amino, amido, acrylamido, methacrylamido, and mercapto.

Preferred organofunctional groups are ethylenically unsaturated and contain from 2 to about 10 carbon atoms. Particularly preferred embodiments of $R^3$ are vinyl and hexenyl.

When X represents a hydrolyzable group, this group can be any one that reacts with water to form a silanol group. Suitable hydrolyzable groups include, but are not limited to, alkoxy, isoalkenyloxy and amino. When X represents a hydrolyzable group it is preferably an alkoxy group containing from 1 to about 20 carbon atoms, most preferably from 1 to 4 carbon atoms. Preferred alkoxy groups are methoxy and ethoxy, based on the relatively high volatility of the alcohol produced upon the reaction of these groups.

Organosiloxanes preferred for use as ingredient B are liquids at 25° C. with a viscosity of from about 0.001 to about 0.1 Pa.s at 25° C. and contain an average of from 2 to about 50 repeating units per molecule. Each of the terminal silicon atoms of the organosiloxane preferably contains at least one group that will react with the hydroxyl groups present on the polyhydric alcohol (ingredient A) or with the hydrolyzable group of the silane (ingredient C) described in the following section. Hydroxyl groups are preferred terminal groups for ingredient B.

A particularly preferred organosiloxane is a hydroxyl-terminated dimethylsiloxane/methylvinylsiloxane copolymer containing an average of from 2 to 10 repeating units per molecule.

The Silane (Ingredient C)

The silane that is reacted with the polyol (ingredient A) and the organosiloxane (ingredient B) to obtain the present organosilicon compositions exhibits the general formula $R^4{}_tSiY_{4-t}$ where $R^4$ represents a monovalent hydrocarbon radical that is unsubstituted or contains an organofunctional substituent selected from the group consisting of $CH_2=CH-$, acryloxy, methacryloxy, epoxy, carboxy, amino, amido, acrylamido, methacrylamido, and mercapto. As discussed in connection with $R^3$, the hydrocarbon portion of $R^4$ can be aliphatic such as alkylene, or it can be aromatic such as phenylene. The hydrocarbon portion of $R^4$ is preferably alkylene containing from 3 to 10 carbon atoms and the organofunctional portion is preferably an epoxy group. $R^4$ is most preferably 3-glycidoxypropyl.

The hydrolyzable group of the silane, represented by Y in the foregoing formula, is selected from the same group as the hydrolyzable groups of the polyorganosiloxane, ingredient B. Y is preferably alkoxy containing from 1 to 4 carbon atoms.

Ingredient C can be a single silane or a mixture of silanes, one or more of which can contain organofunctional substituents on the hydrocarbon radical represented by $R^4$. A preferred combination of silanes is a tetraalkoxysilane such as tetraethoxysilane and a silane containing an organofunctional group such as 3-glycidoxy-propyl or 3-methacryloxypropyl.

The relative concentrations of ingredients A, B and C used to prepare the present organosilicon compositions are dependent upon the number of reactive groups present on these ingredients. These reactive groups include the hydroxyl and hydrolyzable groups represented by X and Y.

The relative concentrations of ingredients A, B and C should be selected to avoid crosslinking of the composition to the extent that gelation occurs, which would make the organosilicon composition incompatible with the curable organopolysiloxane into which the composition will be incorporated as an adhesion promoter. Preferably, the molar ratio of (A) to (B) is 10:1 to 1:2.

In preferred organosilicon compositions, the polyhydric alcohol (ingredient A) and the organosiloxane (ingredient B) each contain two reactive groups per molecule and the silane (ingredient C) contains an average of from three to four hydrolyzable groups per molecule. These preferred compositions contain from 1 to 2 moles of polyhydric alcohol per mole of organosiloxane. The concentration of silane(s) is based on the number of equivalent weights of hydroxyl and hydrolyzable groups represented by X in the formulae for ingredients A and B. Preferably from 0.67 to 1.0 mole, more preferably 0.75 to 0.95 mole of silane(s) (ingredient C) should be present for each equivalent of these hydroxyl and hydrolyzable groups.

The adhesion-promoting organosilicon compositions of the present invention are prepared by reacting ingredients A, B and C. This reaction is conducted under conditions that are typical for interchange reactions between alcohols and the silicon-bonded hydroxyl and/or hydrolyzable groups such as alkoxy and isoalkenyloxysilanes present on ingredients B and C.

These interchange reactions are typically conducted under an inert, anhydrous atmosphere such as nitrogen at temperatures from ambient to 200° C. and may employ a catalyst. Suitable catalysts include, but are not limited to, acids, bases and organotitanium compounds.

The weight of catalyst typically constitutes from about 0.1 to about 5 percent of the combined weight of all reactants.

Reactions of silicon bonded hydroxyl, alkoxy and isoalkenyloxy groups to form siloxane bonds generate water, an alcohol or a ketone by-product, respectively. Because these reactions are often reversible, it is usually desirable to remove these by-products by distillation as the reaction progresses.

The course of reactions involving the generation and removal of water, alcohol or ketone by-products can readily be followed by measuring the amount of by-product collected.

The reactants and any catalyst used to prepare the reaction products of the invention are heated for a period of time sufficient to achieve a substantially complete reaction, as indicated by the amount of by-product water, alcohol and/or ketone collected. This time period is typically from 1 to about 5 hours and the reaction mixture is preferably heated from about 50 to 120° C.

The polyhydric alcohol/siloxane/silane reaction products of the present invention are useful as adhesion-promoting additives for curable organopolysiloxane compositions containing any of the reactive groups described in the prior art.

Good adhesion of curable organopolysiloxane compositions is desirable for a variety of end use applications, particularly in electronics, construction, packaging, automotive and consumer markets.

Reactions useful for curing organosiloxane compositions are known in the art, and include but are not limited to 1) the reaction of silicon-bonded hydrolyzable groups such as a alkoxy and carboxy with atmospheric moisture, optionally in the presence of a catalyst, 2) the reaction of organohydrogensiloxanes with polyorganosiloxanes containing either silicon-bonded hydroxyl groups or olefinically unsaturated hydrocarbon radicals such as vinyl or hexenyl in the presence of a platinum group metal-containing catalyst, and 3) cationic or free radical reactions initiated by the decomposition of photolytically unstable compounds or exposure to high energy radiation.

The following examples describe preferred embodiments of the present organosilicon compositions and curable organopolysiloxane compositions containing these organosilicon compositions as adhesion-promoting additives. These examples should not be interpreted as limiting the scope of the present invention as defined in the accompanying claims. Unless otherwise specified, all parts and percentages are by weight and viscosities were measured at 25° C.

EXAMPLE 1

An organosilicon composition of the present invention was prepared by placing 61.42 parts of tetraethyl orthosilicate and 0.10 parts of tetrabutyl titanate into a dry glass reactor equipped with an addition funnel, distillation head, condenser, receiver vessel cooled with dry ice, and a nitrogen purge.

Into the addition funnel were placed 5.72 parts ethylene glycol and 32.86 parts of a hydroxyl-terminated methylvinylpolysiloxane having a hydroxyl content of 10.1 wt % and a vinyl content of 10.1 wt %.

The contents of the reactor were heated to about 90° C. with stirring under a current of nitrogen, at which time the contents of the addition funnel were added slowly over about 40 minutes. Heating and stirring of the reaction mixture were continued for an additional 23 minutes following completion of the addition, at which time the flow of nitrogen through the reactor was discontinued and vacuum was applied to the reactor. The pressure was reduced to about 50 mm Hg in 10 minutes and maintained at that pressure for 29 minutes. The reaction mixture was then cooled and brought to atmospheric pressure. 75.1 g of a transparent, deep yellow fluid product were recovered from the reactor and will be referred to as OC-1.

EXAMPLE 2

An organosilicon composition of the present invention was prepared by placing 64.36 parts of 3-glycidoxypropyltrimethoxysilane and 0.10 part of tetrabutyl titanate into a glass reactor equipped as described in the preceding example 1. The addition funnel had been charged with 5.28 parts of ethylene glycol and 30.36 parts of a hydroxyl-terminated polymethylvinylsiloxane having a hydroxyl content of 10.1 wt % and a vinyl content of 10.1 wt % and the ingredients mixed. The reaction mixture was then stirred and heated to about 90° C. under a current of nitrogen, at which time the contents of the addition funnel were added slowly over about 42 minutes. Heating and stirring were continued for an additional 20 minutes following completion of the addition, at which time the flow of nitrogen was discontinued and vacuum applied to the reactor.

The pressure was reduced to about 50 mm Hg in 6 minutes and maintained at that pressure for 32 minutes. The reaction mixture was then cooled, brought to atmospheric pressure, and 85.87 g of a translucent, tan fluid recovered that will be referred to as OC-2.

EXAMPLE 3

An organosilicon composition of this invention was prepared by charging a glass reactor equipped as described in Example 1 with 29.49 parts of tetraethyl orthosilicate, 33.46 parts of 3-glycidoxypropyltrimethoxysilane and 0.10 parts of tetrabutyl titanate. Into the addition funnel were placed 5.49 parts ethylene glycol and 31.56 parts of a hydroxyl-terminated polymethylvinylsiloxane having a hydroxyl content of 10.1 wt % and a vinyl content of 10.1 wt % and the ingredients mixed. The reaction mixture was then stirred and heated to about 90° C. under a current of nitrogen, at which time the contents of the addition funnel were added slowly over about 44 minutes. Heating and stirring were continued for an additional 20 minutes following completion of the addition, at which time the flow of nitrogen was discontinued and vacuum applied to the reactor. The pressure was reduced to about 50 mm Hg in 6 minutes and maintained at that pressure for 23 minutes.

The contents of the reactor were then cooled, brought to atmospheric pressure, yielding 82.52 g of a translucent, yellow-tan liquid that will be referred to as OC-3.

EXAMPLE 4

An organosilicon composition of the present invention was prepared by charging a glass reactor equipped as described in Example 1 with 29.19 parts of tetraethylorthosilicate, 31.16 parts of 3-methacryloxypropyl-trimethoxysilane and 0.10 part of tetrabutyl titanate. The addition funnel had been charged with 8.15 parts ethylene glycol and 31.50 parts of a hydroxyl-terminated polymethylvinylsiloxane with a hydroxyl content of 10.1 wt % and a vinyl content of 10.1 wt %. The reaction mixture was then stirred and heated to about 90° C. under a current of nitrogen, at which time the contents of the addition funnel were added slowly over about 31 minutes. Heating and stirring of the reaction mixture were continued for 21 minutes following completion of the addition, at which time the nitrogen flow through the reactor was discontinued and vacuum applied. The pressure was reduced to about 50 mm Hg in 6 minutes and maintained at that pressure for 25 minutes. The reaction mixture was then cooled, brought to atmospheric pressure, yielding 69.74 g of a transparent, yellow, viscous liquid product that will be referred to as OC-4.

(Comparative) Example 5

For comparative purposes, an organosilicon compound outside the scope of the present invention was prepared by weighing 84.30 parts tetraethyl orthosilicate and 0.10 part tetrabutyl titanate into a glass reactor equipped as described in Example 1. Into the addition funnel had been weighed 15.70 parts ethylene glycol and 15.70 parts ethyl alcohol. The reaction mixture was then stirred, heated to about 90° C., and the ethylene glycol/ethyl alcohol solution added slowly over about 55 minutes. The initially yellow mixture in the reaction flask became clear upon addition of the ethylene glycol/ethyl alcohol solution. Heating and stirring of the reaction mixture were continued for 20 minutes following completion of the addition, at which time the nitrogen flow through the reactor was discontinued and vacuum applied to the reactor. The pressure was reduced to about 50 mm Hg in 14 minutes and maintained at that pressure for 20 minutes. The reaction mixture was then cooled, brought to atmospheric pressure, yielding 69.27 g of a transparent, yellow liquid that will be referred to as CA-1 (Comparative Adhesion Additive-1). The reactants used to prepare this organosilicon composition did not include the organosiloxane referred to as ingredient B of the present invention.

EXAMPLE 6

Curable organopolysiloxane compositions containing the organosilicon compositions OC-1, OC-2, OC-3, and OC-4 at two concentration levels were prepared by making a physical blend of the ingredients. Tetrabutyl titanate (TBT) was used as a catalyst to increase the rate of adhesion development in the curable compositions.

For comparative purposes, additional curable compositions were prepared which either contained no organosilicon compound to promote adhesion or contained the compounds referred to hereinafter as CA-1 to CA-4, which have been taught in the art as promoting adhesion of curable organosiloxane compositions. Adhesion additive CA-1 is described in the preceding (comparative) Example 5, CA-2 was tetraethyl orthosilicate (TEOS), CA-3 was ethyl polysilicate (EPS), and CA-4 was 3-glycidoxypropyltrimethoxysilane.

A two-part curable organopolysiloxane composition was used to evaluate the adhesion promoters. One part (A) of the curable composition contained 52 parts of a dimethylvinylsiloxy-terminated dimethylpolysiloxane having a viscosity of 0.4 Pa.s at 25° C., 46 parts of quartz with an average particle size of 5 microns, 0.9 part of zinc oxide, 0.5 part carbon black, and 0.2 part of a reaction product of hexachloroplatinic acid and sym-tetramethyldivinyldisiloxane that had been diluted with a liquid dimethylvinylsiloxy-terminated polydimethylsiloxane in an amount sufficient to achieve a platinum content of 0.7 weight percent.

The second part (B) of the curable composition contained 46 parts of the same dimethylvinylsiloxy-terminated dimethylpolysiloxane as used for part A, 47 parts of the quartz filler, 6 parts of a trimethylsiloxy-terminated diorganopolysiloxane containing an average of five methylhydrogensiloxane units and three dimethylsiloxane units per molecule with a silicon-bonded hydrogen atom content of 0.8 weight percent and 0.5 part of cyclic methylvinylsiloxanes as a platinum catalyst inhibitor.

The two parts of the curable organopolysiloxane composition were blended with the adhesion promoter to be evaluated and the resultant mixture was deaired before being applied as a 10 mil (0.25 mm)-thick film to one surface of the desired substrate using a draw down bar. The substrates were (1) glass microscope slides, (2) 3003 H14 alloy mill finish aluminum manufactured by Q-Panel Company, Cleveland, Ohio, (3) 2024 T3 bare aluminum panels available as 2024 T3 manufactured by Q-Panel Company, (4) copper panels, and (5) sheets of FR4 epoxy board.

The organosiloxane compositions were cured either at room temperature or for 30 minutes at 70° C. in a forced air oven followed by additional curing time at room temperature.

The adhesion test consisted of scratching the cured coating with the blade of a metal spatula to determine whether the coating could be removed without leaving a residue on the surface (adhesive failure, 0) or whether failure occurred within the coating layer resulting in at least a portion of the coating material in the tested area adhering to the substrate. On some samples the coating exhibited adhesive failure in one area and cohesive failure in another, and was rated as adhesive/cohesive failure (1). Coatings exhibiting cohesive failure were further tested to determine if the residue on the substrate and the adjacent coating material could be removed by rubbing with a finger. If the coating could be removed in this manner, the pressure required to remove the coating was rated on a scale of slight (2), medium (3), or high (4). If the coating could not be removed by rubbing, this was classified as (5).

Table 3 summarizes the initial (Int.) adhesion results after cure in an oven followed by additional cure at room temperature (1D=1 day; 3D=3 days). Some of the films were not cured upon removal from the oven (NC).

TABLE 1

Compositions of the Present Invention

| Composition | 1 | 2 | 3 | 4 | 5 | 6 |
|---|---|---|---|---|---|---|
| pts Part A | 7.50 | 7.50 | 7.50 | 7.50 | 7.50 | 7.50 |
| pts Part B | 7.48 | 7.48 | 7.48 | 7.48 | 7.48 | 7.48 |
| pts TBT | .015 | .015 | .015 | .015 | .015 | .015 |
| Additive | OC-1 | OC-1 | OC-2 | OC-2 | OC-3 | OC-3 |
| pts Additive | 0.38 | 0.75 | 0.38 | 0.75 | 0.38 | 0.75 |

TABLE 2

Comparative Compositions of the Prior Art

| Composition | C1 | C2 | C3 | C4 | C5 | C6 | C7 | C8 | C9 |
|---|---|---|---|---|---|---|---|---|---|
| pts Part A | 7.50 | 7.50 | 7.50 | 7.50 | 7.50 | 7.50 | 7.50 | 7.50 | 7.50 |
| pts Part B | 7.48 | 7.48 | 7.48 | 7.48 | 7.48 | 7.48 | 7.48 | 7.48 | 7.48 |
| pts TBT | .015 | .015 | .015 | .015 | .015 | .015 | .015 | .015 | .015 |
| Additive | None | CA-1 | CA-1 | CA-2 | CA-2 | CA-3 | CA-3 | CA-4 | CA-4 |
| pts Additive | — | 0.38 | 0.75 | 0.38 | 0.75 | 0.38 | 0.75 | 0.38 | 0.75 |

Compositions C1 through C9 were for comparative purposes.

TABLE 3

Initial Curing at 70° C., Additional Curing At Room Temperature

| Composition | Glass | | | Bare Aluminum | | | Mill Aluminum | | | Copper | | | Epoxy | | |
|---|---|---|---|---|---|---|---|---|---|---|---|---|---|---|---|
| (Adhesion Additive) | Int. | 1D | 3D | Int. | 1D | 3D | Int. | 1D | 3D | Int. | 1D | 3D | Int. | 1D | 3D |
| 1 (OC-1) | 5 | 5 | 5 | 5 | 5 | 5 | 5 | 5 | 5 | 1 | 5 | 2 | 5 | 5 | 1 |
| 2 (OC-1) | 2 | 2 | 5 | NC | 2 | 5 | 2 | 2 | 5 | NC | 0 | 1 | NC | 2 | 5 |
| 3 (OC-2) | 5 | 5 | 5 | 0 | 0 | 0 | 5 | 1 | 1 | 0 | 0 | 2 | 5 | 5 | 5 |
| 4 (OC-2) | NC | 0 | 0 | NC | 2 | 2 | NC | 2 | 2 | NC | 2 | 3 | NC | 2 | 2 |
| 5 (OC-3) | 1 | 1 | 5 | 5 | 5 | 5 | 5 | 5 | 5 | 5 | 5 | 5 | 5 | 5 | 5 |
| 6 (OC-3) | NC | 2 | 2 | NC | 2 | 2 | NC | 2 | 2 | NC | 2 | 2 | NC | 2 | 2 |
| Comparative Examples | | | | | | | | | | | | | | | |
| C1 (None) | 2 | 5 | 5 | 0 | 0 | 0 | 0 | 0 | 0 | 0 | 0 | 0 | 0 | 0 | 0 |
| C2 (C-1) | 5 | 5 | 5 | 5 | 5 | 5 | 5 | 5 | 5 | 0 | 0 | 5 | 0 | 1 | 1 |
| C3 (C-1) | 5 | 5 | 5 | 5 | 5 | 5 | 5 | 5 | 5 | 0 | 1 | 5 | 1 | 1 | 5 |
| C4 (C-2) | 0 | 3 | 5 | 0 | 0 | 5 | 0 | 0 | 0 | 0 | 0 | 0 | 0 | 0 | 0 |
| C5 (C-2) | 0 | 0 | 5 | 0 | 0 | 5 | 0 | 0 | 0 | 0 | 0 | 0 | 0 | 0 | 0 |
| C6 (C-3) | 0 | 0 | 0 | 0 | 0 | 0 | 0 | 0 | 0 | 0 | 0 | 0 | 0 | 0 | 0 |
| C7 (C-3) | 0 | 0 | 0 | 0 | 0 | 0 | 0 | 0 | 0 | 0 | 0 | 0 | 0 | 0 | 0 |
| C8 (C-4) | 0 | 0 | 5 | 0 | 0 | 0 | 0 | 0 | 5 | 0 | 0 | 1 | 0 | 0 | 0 |
| C9 (C-4) | 0 | 0 | 0 | 0 | 0 | 0 | 0 | 2 | 5 | 0 | 0 | 0 | 0 | 0 | 0 |

The data in Table 3 demonstrate the following: 1) substantial improvement in adhesion to copper and epoxy resin achieved by the addition of the hydroxyl-terminated methylvinylpolysiloxane present in adhesion additive OC-1 (compositions 2 and 3) to the known combination of ethylene glycol and tetraethyl orthosilicate (adhesion additive C-1, compositions C2 and C3); and 2) substantial improvement in adhesion to glass and epoxy resin achieved by the addition of 3-glycidoxypropyltrimethoxysilane (comparative adhesion additive CA-4) to ethylene glycol and a hydroxyl-terminated methylvinylsiloxane (compositions 3 and 4) is unexpected based on the relative poor adhesion imparted by additive CA-4 alone; (compositions C8 and C9)

The data for compositions C4 and C5 in Table 3 demonstrate the poor performance of tetraethyl orthosilicate (comparative additive CA-2) as an adhesion promoter. Based on these data and the data for comparative additive CA-4 discussed in the preceding paragraph, the excellent adhesion to metal and epoxy resin achieved by reacting these adhesion additives with ethylene glycol and a hydroxyl-terminated methylvinylpolysiloxane to form adhesion additive OC-3 (composition 5) appears unexpected.

The data for compositions 2, 4 and 6 in Table 3 demonstrate the adverse effect on curing of a composition that can occur when too much adhesion promoting additive is present.

To demonstrate the ability of the present adhesion promoting additives to function when compositions containing these additives are cured at room temperature, compositions 2, 3, and 4 were also deposited onto the same substrates and cured at only room temperature. After 7 days, cohesive failure (adhesion rating=5) was achieved on all substrates by all the compositions tested.

EXAMPLE 7

An ultraviolet (UV) curable composition was prepared by combining 97 parts of a UV curable siloxane composition, 0.50 parts of tetrabutyl titanate, and 2.5 parts of adhesion additive OC-3 described in the preceding examples. The UV curable siloxane composition was prepared by blending to homogeneity (1) 79.4 parts of a mixture of (a) 32 weight percent xylene and (b) 68 weight percent of a benzene soluble silicone resin containing dimethylvinylsiloxy units, trimethylsiloxy units, and $SiO_2$ units with (2) 100 parts of dimethylvinylsiloxy-endblocked polydimethylsiloxane having a viscosity of about 2 Pa.s.

The ratio of the sum of the mols of dimethylvinyl-siloxy units and trimethylsiloxy units to $SiO_2$ units in the silicone resin (lb) was 0.65:1 and the resin contained 1.9 weight percent of vinyl radicals.

The mixture of ingredients 1 and 2 was stripped of xylene by heating under reduced pressure, resulting in a clear liquid referred to hereinafter as the "resin-polymer blend". 17.8 parts of a mercapto functional polyorganosiloxane having an average degree of polymerization of 50 and containing an average of five mercapto units was mixed into 80.2 parts of the resin polymer blend along with 0.98 parts of a photo-initiator and stability additives to yield a clear UV curable composition which had a viscosity of 2.1 Pa.s.

Portions of the UV curable composition were drawn down to form 10 mil (0.25 mm)-thick films onto either glass microscope slides, 3003 H14 alloy mill finish aluminum Q-panels, or 2024 T3 bare aluminum. The compositions were then cured by exposure to ultraviolet light at a dose of 500 $mJ/cm^2$. Following this exposure the coated substrates were kept under ambient conditions for one day, at which time they were rated for adhesion as described in the preceding examples. A rating of 5, indicative of cohesive failure, was obtained for all of the substrates.

For comparative purposes a curable siloxane composition containing all of the ingredients of the composition described above with the exception of the adhesion-promoting additive was prepared, coated onto the same substrates and cured as described in the preceding section of this example and then evaluated for adhesion. All of the substrates coated with the composition without the adhesion-promoting additive exhibited adhesive failure, equivalent to a rating of 0.

That which is claimed is:

1. An organosilicon composition formed by reacting (A) a polyhydric alcohol of the formula $R^1(OH)_m$, (B) an organosiloxane containing at least 2 repeating units and exhibiting an average unit formula $R^2_nR^3_pX_qSiO_{(4-n-p-q)/2}$, and (C) at least one silane of the general formula $R^4_rSiY_{4-r}$, where $R^1$ represents a hydrocarbon radical exhibiting a valence of m that is free of ethylenic unsaturation; $R^2$ represents an unsubstituted monovalent hydrocarbon radical; $R^3$ represents a monovalent hydrocarbon radical containing an organofunctional substituent selected from the group consisting of $CH_2=CH-$, acryloxy, methacryloxy, epoxy, carboxy, amino, amido, acrylamido, methacrylamido, and mercapto; $R^4$ represents a monovalent hydrocarbon radical that is unsubstituted or contains an organofunctional substituent selected from the group consisting of $CH_2=CH-$, acryloxy, methacryloxy, epoxy, carboxy, amino, amido, acrylamido, methacrylamido, and mercapto; X represents a hydrolyzable group or a hydroxyl group, Y represents a hydrolyzable group; m is at least 2; the average value of n is from 0 to 3, inclusive; the average values of p and q are greater than 0 and no greater than 3, the sum of n, p and q does not exceed 3; and r is 0 or 1, with the proviso that each molecule of said organosiloxane (B) contains at least one $R^3$ substituent and at least one X substituent, and the relative concentrations of said polyhydric alcohol, organosiloxane and silane do not cause gelation of said organosilicon composition.

2. A composition according to claim 1 wherein $R^1$ contains from 2 to 20 carbon atoms, $R^2$ is selected from the group consisting of methyl, ethyl, propyl, cyclohexyl, phenyl, tolyl, and benzyl; $R^3$ contains a group selected from the group consisting of vinyl, acryloxy, methacryloxy, epoxy, carboxy, amino, amido, acrylamido, methacrylamido, and mercapto; $R^4$ contains an organofunctional substituent; X represents an alkoxy group containing from 1 to 20 carbon atoms or a hydroxyl group; Y represents an alkoxy group containing from 1 to 4 carbon atoms.

3. A composition according to claim 2 wherein $R^1$ contains from 2 to 10 carbon atoms; $R^2$ represents an alkyl radical containing from 1 to 5 carbon atoms; $R^3$ is hexenyl or vinyl; $R^4$ contains an epoxy group; Y is methoxy or ethoxy; said organosiloxane exhibits a viscosity of from about 0.001 to 0.1 Pa.s at 25° C., contains an average of from 2 to 50 repeating units per molecule and each of the terminal silicon atoms of said organosiloxane contains at least one group that will react with the hydroxyl groups present on said polyhydric alcohol or with the hydrolyzable groups present on said silane.

4. A composition according to claim 3 wherein $R^2$ is methyl or ethyl; said polyhydric alcohol and said organosiloxane each contain two reactive groups per molecule; said silane contains an average of from three to four hydrolyzable groups per molecule, the molar ratio of said polyhydric alcohol to said organosiloxane is from 1:1 to 2:1; from 0.75 to 0.95 mole of said silane is present for each equivalent weight of the total of (1) hydroxyl groups present in said polyol and (2) hydroxyl groups present in said organosiloxane; and the terminal silicon atoms of said organosiloxane contain a hydroxyl group.

5. A polymer composition comprising (I) an organopolysiloxane containing functional groups capable of reacting to cure said organopolysiloxane, (II) a curing agent for said organopolysiloxane, and (III) an adhesion promoter to enhance the adhesion of said composition following curing, wherein said adhesion promoter is an organosilicon formed by reacting (A) a polyhydric alcohol of the general formula $R^1(OH)_m$, (B) an organosiloxane containing at least 2 repeating units and exhibiting the average unit formula $R^2_nR^3_pX_qSiO_{(4-n-p-q)/2}$, and (C) at least one silane of the general formula $R^4_rSiY_{4-r}$, where $R^1$ represents a hydrocarbon radical exhibiting a valence of m that is free of ethylenic unsaturation; $R^2$ represents an unsubstituted monovalent hydrocarbon radical; $R^3$ represents a monovalent hydrocarbon radical containing an organofunctional substituent selected from the group consisting of $CH_2=CH-$, acryloxy, methacryloxy, epoxy, carboxy, amino, amido, acrylamido, methacrylamido, and mercapto; $R^4$ represents a monovalent hydrocarbon radical that is unsubstituted or contains an organofunctional substituent selected from the group consisting of $CH_2=CH-$, acryloxy, methacryloxy, epoxy, carboxy, amino, amido, acrylamido, methacrylamido, and mercapto; X represents a hydrolyzable group or a hydroxyl group, Y represents a hydrolyzable group; m is at least 2; the average value of n is from 0 to 3, inclusive; the average values of p and q are greater than 0 and no greater than 3, the sum of n, p and q does not exceed 3; and r is 0 or 1, with the proviso that each molecule of said organosiloxane (B) contains at least one $R^3$ substituent and at least one X substituent and the relative concentrations of said polyhydric alcohol, said organosiloxane and said silane do not cause gelation of said organosilicon composition.

6. A composition according to claim 5 wherein $R^1$ contains from 2 to 20 carbon atoms, $R^2$ is selected from the group consisting of methyl, ethyl, propyl, cyclohexyl, phenyl, tolyl, and benzyl; $R^3$ contains a group selected from the group consisting of vinyl, acryloxy, methacryloxy, epoxy, carboxy, amino, amido, acrylamido, methacrylamido, and mercapto; $R^4$ contains an organofunctional substituent; X represents an alkoxy group containing from 1 to 20 carbon atoms or a hydroxyl group, Y represents an alkoxy group containing from 1 to 4 carbon atoms.

7. A composition according to claim 6 wherein $R^1$ contains from 2 to 10 carbon atoms; $R^2$ represents an alkyl radical containing from 1 to 4 carbon atoms; $R^3$ is hexenyl or vinyl; $R^4$ contains an epoxy group; Y is methoxy or ethoxy; said polyorganosiloxane contains an average of from 2 to 50 repeating units per molecule, exhibits a viscosity of from 0.001 to 0.1 Pa.s at 25° C. and each of the terminal silicon atoms of said organosiloxane contains at least one group that will react with the hydroxyl groups present on said polyhydric alcohol or the hydrolyzable groups present on said silane.

8. A composition according to claim 7 wherein $R^2$ is methyl or ethyl, said polyhydric alcohol and said organosiloxane each contain two reactive groups per molecule, said silane contains an average of 3 to 4 hydrolyzable groups per molecule, the molar ratio of said polyhydric alcohol to said organosiloxane is from 1:1 to 2:1; from 0.75 to 0.95 moles of silane is used for each total equivalent weight of (1) hydroxyl groups present in said polyol and (2) hydroxyl groups present in said organosiloxane; and the terminal silicon atoms of said organosiloxane contain a hydroxyl group.

* * * * *